United States Patent
Nagai et al.

(10) Patent No.: US 7,356,514 B2
(45) Date of Patent: *Apr. 8, 2008

(54) REPRODUCTION APPARATUS AND REPRODUCTION METHOD OF DIGITAL VIDEO SIGNAL OR AUDIO SIGNAL

(75) Inventors: Yutaka Nagai, Yokohama (JP); Toshifumi Takeuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/515,833

(22) Filed: Sep. 6, 2006

(65) Prior Publication Data

US 2007/0003218 A1 Jan. 4, 2007

Related U.S. Application Data

(63) Continuation of application No. 09/290,251, filed on Apr. 13, 1999, now Pat. No. 7,117,181.

(30) Foreign Application Priority Data

Apr. 14, 1998 (JP) .............................. 10-102385

(51) Int. Cl.
*G11B 7/28* (2006.01)
*G11B 5/09* (2006.01)
*G11B 5/86* (2006.01)
*G11B 20/10* (2006.01)
*G11B 27/36* (2006.01)

(52) U.S. Cl. ..................... 705/57; 705/51; 360/15; 360/60; 369/47.12; 369/53.2; 369/53.21; 369/84; 369/85

(58) Field of Classification Search ................. 705/51, 705/57; 369/47.12, 53.2, 53.21, 59.1, 84, 369/85; 360/15, 60; 386/94
See application file for complete search history.

(56) References Cited

U.S. PATENT DOCUMENTS 5,608,718 A * 3/1997 Schiewe ................. 369/275.4

(Continued)

FOREIGN PATENT DOCUMENTS

JP 5-325412 12/1993

(Continued)

OTHER PUBLICATIONS

Anon., "Digital Image Piracy: Security for Copyright Material," CIP Executive Briefings, Jul. 1, 1996.*

(Continued)

*Primary Examiner*—Nicholas D. Rosen
(74) *Attorney, Agent, or Firm*—Antonelli, Terry, Stout & Kraus, LLP.

(57) ABSTRACT

A reproduction method and apparatus for reproducing video data and/or audio data from a recordable medium having video data and/or audio data recorded thereon. The video data and/or audio data is generated by superimposing information concerning an attribute of a video signal and/or an audio signal on a signal of digitized video data and/or a signal of digitized audio data. Information concerning a copyright superimposed on the video data and/or audio data is reproduced from the medium, and a type of the medium is identified. Reproduction is stopped in response to a determination that the medium is illegally produced, the determination being based on a combination of the information concerning a copyright which is reproduced and the type of the medium identified.

8 Claims, 4 Drawing Sheets

U.S. PATENT DOCUMENTS

| | | | |
|---|---|---|---|
| 5,878,188 A * | 3/1999 | Amada et al. | 386/101 |
| 5,896,454 A * | 4/1999 | Cookson et al. | 360/60 |
| 6,018,506 A | 1/2000 | Okabe | |
| 6,421,450 B2 * | 7/2002 | Nakano | 382/100 |
| 7,277,248 B2 * | 10/2007 | Sugiyama et al. | 360/69 |

FOREIGN PATENT DOCUMENTS

| | | |
|---|---|---|
| JP | 06-302092 | 10/1994 |
| JP | 06-314172 | 11/1994 |
| JP | 8-180584 | 7/1996 |
| JP | 09-055025 | 2/1997 |
| JP | 09-214845 | 8/1997 |
| JP | 9-265734 | 10/1997 |
| JP | 10-64179 | 3/1998 |

OTHER PUBLICATIONS

Fox, B., "Wobble Drives Pirates off the Digital Seas," New Scientist, vol. 153, Issue 2070, Feb. 22, 1997.*

Anon., "Macrovision, Digimarc propose Digital Watermarking Solution for Digital Copy Protection," EMedia Professional, vol. 10, No. 12, p. 22+, Dec. 1997.*

Anon., "Macrovision Completes Strategic Investment in Digimarc Corporation," Business Wire, p. 01260226, Jan. 26, 1998.*

* cited by examiner

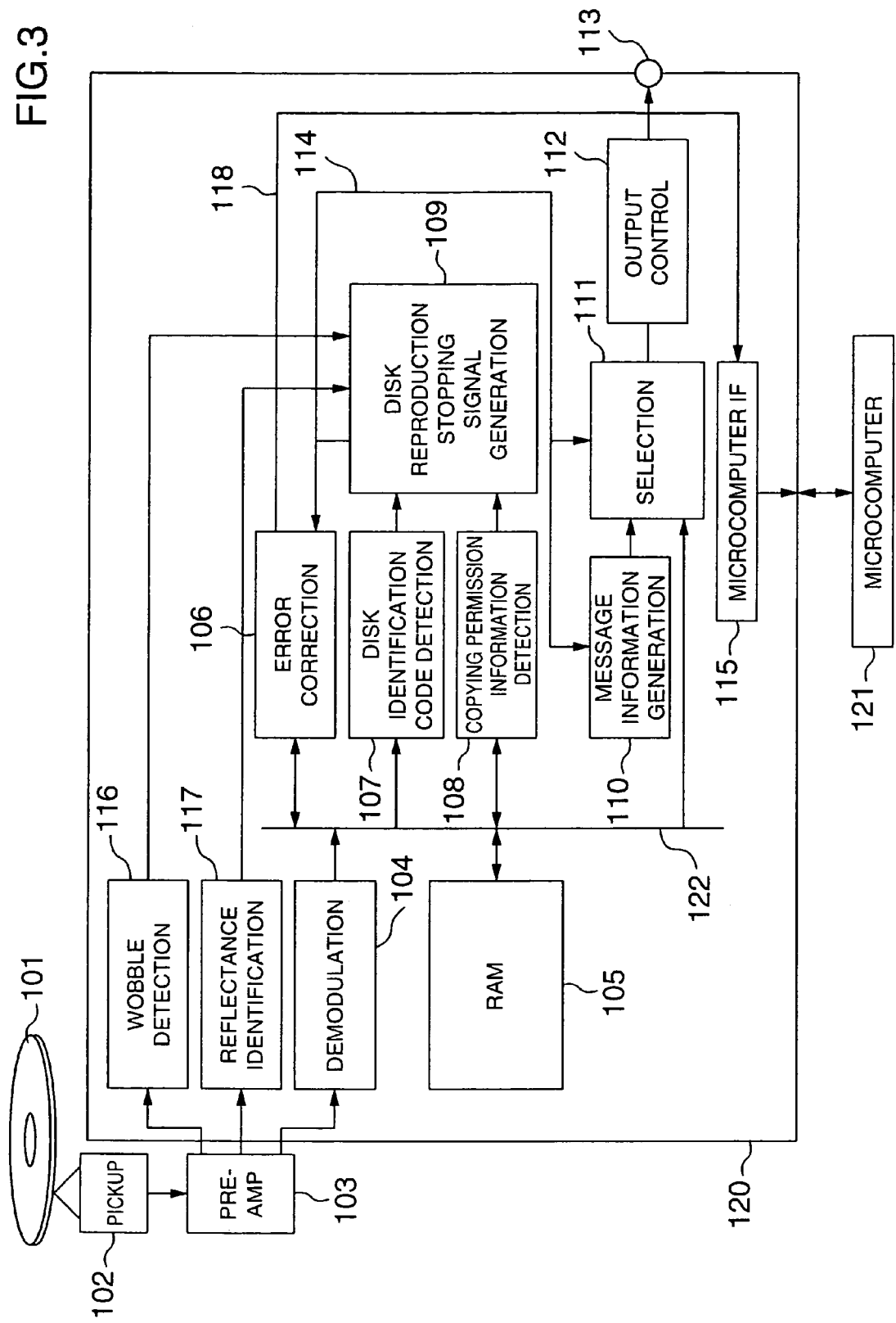

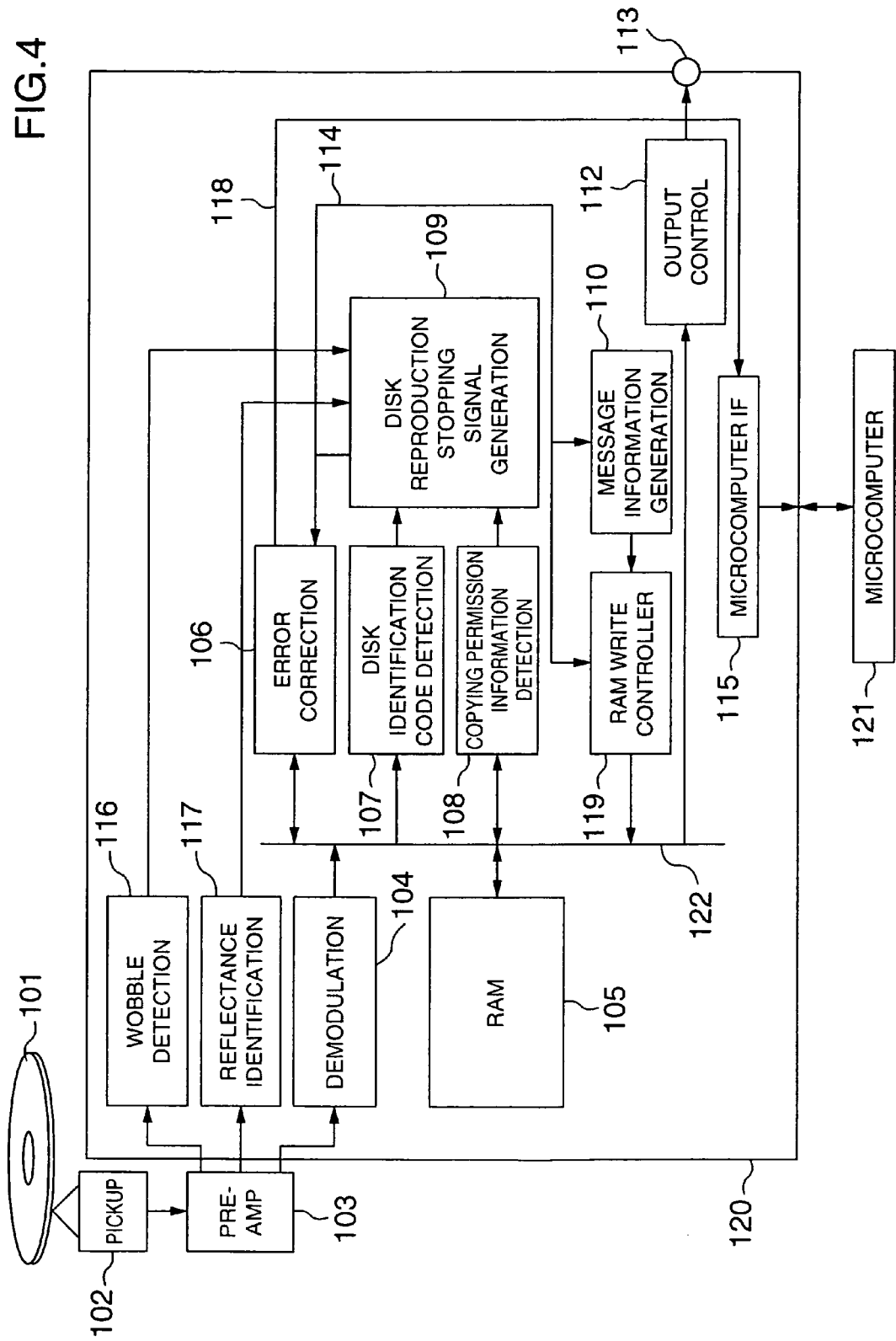

REPRODUCTION APPARATUS AND REPRODUCTION METHOD OF DIGITAL VIDEO SIGNAL OR AUDIO SIGNAL

CROSS REFERENCE TO RELATED APPLICATION

This application is a continuation application of U.S. Ser. No. 09/290,251, filed Apr. 13, 1999, now U.S. Pat. No. 7,117,181, the contents of which are incorporated herein by reference, and relates to U.S. application Ser. No. 09/712,970, filed Nov. 16, 2000, now U.S. Pat. No. 6,996,545, which is also a continuation of U.S. Ser. No. 09/290,251.

BACKGROUND OF THE INVENTION

The present invention relates to a reproduction apparatus for a signal recorded on a medium such as an optical storage medium, and in particular to a technique making it possible to protect a copyright of the signal recorded on the medium.

A digital video disk (DVD) for recording an audio/video (AV) signal compressed by using MPEG2 has a problem that the AV signal could be copied without quality degradation because the AV signal is handled as digital data.

In opposition to this, there has been introduced a technique of an electronic watermark for superimposing information such as permission, inhibition, or permission of only one generation as to copying so that the user may not sense it as described in Nikkei Electronics, Feb. 24, 1997, pp. 99-123. In the above described technique, there is described, for example, a method for conducting copying prevention processing on analog output in accordance with a detected signal.

In the case of a medium such as a broadcasting which permits copying only once, however, it is not considered to protect a copyright by restricting reproduction, using a player of each user, of a pirated edition disk which is produced by copying a signal onto a DVD-R disk (capable of recording the signal once) or the like and thereafter further copying the signal from the DVD-R disk to a DVD-ROM.

SUMMARY OF THE INVENTION

Assuming that copying is permitted only once in broadcasting or the like, an object of the present invention is to provide a technique for preventing a pirated edition disk which is produced by recording a signal onto a DVD-R disk (capable of recording the signal once), a DVD-RAM disk (rewritable), or the like and thereafter illegally copying the recorded signal to a DVD-ROM, from being reproduced by an ordinary user's player capable of reproducing DVD-ROM, DVD-R and DVD-RAM disks.

Another object of the present invention is to report the cause of the reproduction stoppage to the user correctly in the case where reproduction is inhibited.

Originally, a medium allowing copying only once does not exist in DVD-ROM disks. In other words, it is impossible in DVD-ROMs to detect information which has permitted copying of only one generation, from video data. In the case where a signal from a medium permitting copying only once, such as broadcasting, is recorded on a recordable medium such as DVD-R/RAM and the recorded signal is copied onto a DVD-ROM to produce a pirated edition, information which has permitted copying of only one generation is detected from the video data. Therefore, in accordance with an aspect of the present invention, a means for identifying whether a disk is a DVD-R, a DVD-RAM, or a DVD-ROM, and a means for detecting superimposed or embedded information concerning permission of copying from video data are provided. If the disk is a DVD-ROM and information identifying that copying of one generation has been permitted, such as an electronic watermark and copying protect cryptographic information is detected, then reproduction from the disk is inhibited, the reason of the reproduction stoppage is provided. So, the fact that the reproduction has been stopped due to a copyright problem is reported to the user. As a result, the above described objects are achieved.

BRIEF DESCRIPTION OF THE DRAWING

FIG. 3 is a block circuit diagram of a DVD reproduction apparatus showing a third embodiment of the present invention; and FIG. 4 is a block circuit diagram of a DVD reproduction apparatus showing a fourth embodiment of the present invention.

DESCRIPTION OF THE EMBODIMENTS

Figure 1:
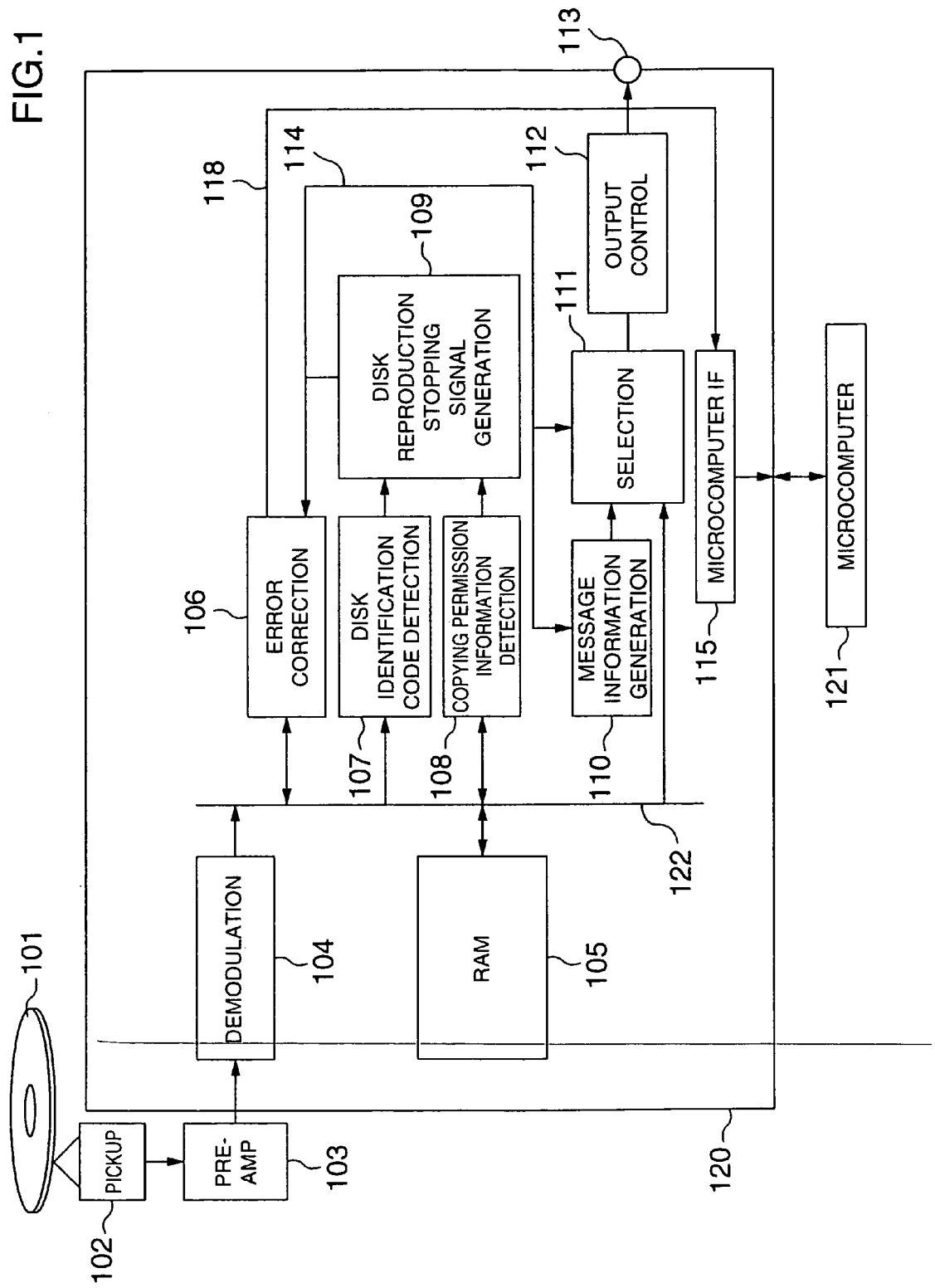
FIG. 1 is a block circuit diagram of a DVD reproduction apparatus showing a first embodiment of the present invention.

A first embodiment of the present invention will now be described by referring to the drawing.

FIG. 1 is a block diagram of a DVD reproduction apparatus showing an embodiment of the present invention. Numeral 101 denotes a DVD-ROM disk, a DVD-R disk, or a DVD-RAM disk having video data or the like recorded thereon. In the present embodiment, video data or audio data having copying permission information superimposed thereon or embedded therein is recorded in each of the above described disks. The superimposed copying permission information cannot be altered without significantly degrading the quality of the original video data or audio data. A disk identification code (a code for identifying whether the disk is a disk dedicated for reproduction) is further added to the video data or audio data. Numeral 102 denotes an optical pickup for detecting a signal from the disk 101. Numeral 103 denotes a preamplifier for conducting amplification, waveform equalization, and the like on a signal detected by the optical pickup. Numeral 104 denotes a demodulation circuit for converting a reproduced signal to binary values and conducting bit synchronization and demodulation. Numeral 105 denotes a RAM for temporarily storing the reproduced data thus demodulated. Numeral 106 denotes an error correction circuit for conducting error correction processing on data demodulated and stored in the RAM 105. Numeral 107 denotes a detection circuit for detecting a disk identification code recorded on the disk together with the video data or the like. Numeral 108 denotes a detection circuit for detecting superimposed copying permission information from the video data. Numeral 109 denotes a circuit for generating a disk reproduction stopping signal 114 from the detected identification code and the copying permission information. If the disk reproduction stopping signal 114 has been generated, then the error correction circuit 106 destroys data instead of correcting data, and simultaneously generates a flag 118 indicating that an error is incorrectable. Numeral 110 denotes a message information generation circuit for generating video data (such as characters or an illustration) or an audio signal indicating that the reproduction is impossible. Numeral 111 denotes a selection circuit for selecting either data subjected to correction processing stored in the RAM 105 or message information supplied from the message information generation circuit, in accordance with the disk reproduction stopping signal 114. Numeral 112 denotes an output control circuit for conducting timing control and the like to output data from the selection circuit 111. Numeral 113 denotes a data output terminal. Numeral 115 denotes an interface for a microcomputer. Numeral 121 denotes a microcontroller for controlling a signal processing device 120 formed of components 104, 105, 106, 107, 108, 109, 110, 111, 112, 114 and 115. Numeral 122 denotes a data/signal transfer bus among the demodulation circuit 104, the RAM 105, the error correction circuit 106, the detection circuits 107 and 108, and the selection circuit 110.

Reproduction from a disk in the present DVD reproduction apparatus will hereafter be described.

A signal recorded on the disk 101 is converted to an electric signal by the pickup 102. The electric signal is subjected in the preamplifier 103 to amplification and waveform equalization. Thereafter, in the demodulation circuit 104, the reproduced signal is converted to binary values, and subjected to bit synchronization and demodulation. The reproduced data thus demodulated is temporarily stored in the RAM 105. The stored data is subjected to error correction processing in the error correction circuit 106. The reproduced data thus corrected is sent to the copying permission information detection circuit 108. The copying permission information detection circuit 108 detects the superimposed copying permission information from the reproduced data. The copying permission information indicates which of the following types the recorded data is:

1) copying is possible; 2) copying is inhibited; and 3) copying of only one generation was permitted.

This detected information is sent to the disk reproduction stopping signal generation circuit 109. The disk identification code detection circuit detects the disk identification code added to the video data or audio data, and sends a result to the disk reproduction stopping signal generation circuit 109. The disk identification code identifies 1) a disk dedicated to reproduction, or 2) a recordable disk. If the copying permission information represents "copying of only one generation was permitted" and the disk identification code is judged to be a disk dedicated to reproduction, then the disk reproduction stopping signal generation circuit 109 makes the disk reproduction stopping signal 114 active. Upon the disk reproduction stopping signal 114 becoming active, the error correction circuit 106 destroys the reproduced data stored in the RAM and sends a flag indicating that error is incorrectable to the microcontroller 115. Upon the disk reproduction stopping signal 114 becoming active, the message information generation circuit 110 generates video or audio message data indicating that the reproduction has been stopped due to violation of copying consent. The above described message information may include where to make contact with a copyright managing organization (such as its telephone number, address, and the like). The message information generation circuit 110 may be a ROM or the like storing generated data. Normally, the selection circuit 111 selects reproduced data read out from the RAM. When the disk reproduction stopping signal 114 is active, the selection circuit 111 selects the message information supplied from the message information generation circuit 110.

As heretofore described, in the present embodiment, it is possible to inhibit reproduction of a pirated edition disk which is produced by temporarily recording a video signal or an audio signal from broadcasting which may be permitted to be copied by only one generation onto a DVD-R or DVD-RAM, and then copying the video signal or the audio signal onto a DVD-ROM on the basis of the DVD-R or DVD-RAM.

Furthermore, by outputting the message signal, users can recognize that the reproduction inhibition is not caused by a failure of the reproduction apparatus or a damage of the disk, but caused by a problem of the copyright. In addition, by displaying where to make contact with the copyright managing organization, it is possible to collect information for identifying a person who produced the pirated edition from users. Furthermore, in the case of a violation of a copyright, destruction of data is also conducted. In the case where the signal processing device 120 is formed as a single semiconductor chip, therefore, data is destroyed and cannot be read out, even if software of the micro-controller is falsified and correction impossibility flag is disregarded. If the disk reproduction stopping signal 114 in the disk reproduction stopping signal generation circuit. 109 is made active, provided that the copying permission information indicates "copying of only one generation was permitted" and the disk identification code is judged to be a disk dedicated to reproduction or provided that the copying permission information is "copying is inhibited" and the disk identification code is judged to a recordable disk, then a DVD-R/RAM produced by illegally recording contents of a disk inhibited from being copied can also be prevented from being reproduced. According to the present embodiment, a reproduction apparatus capable of sufficiently protecting a copyright can be provided.

A second embodiment of the present invention will now be described.

Figure 2:
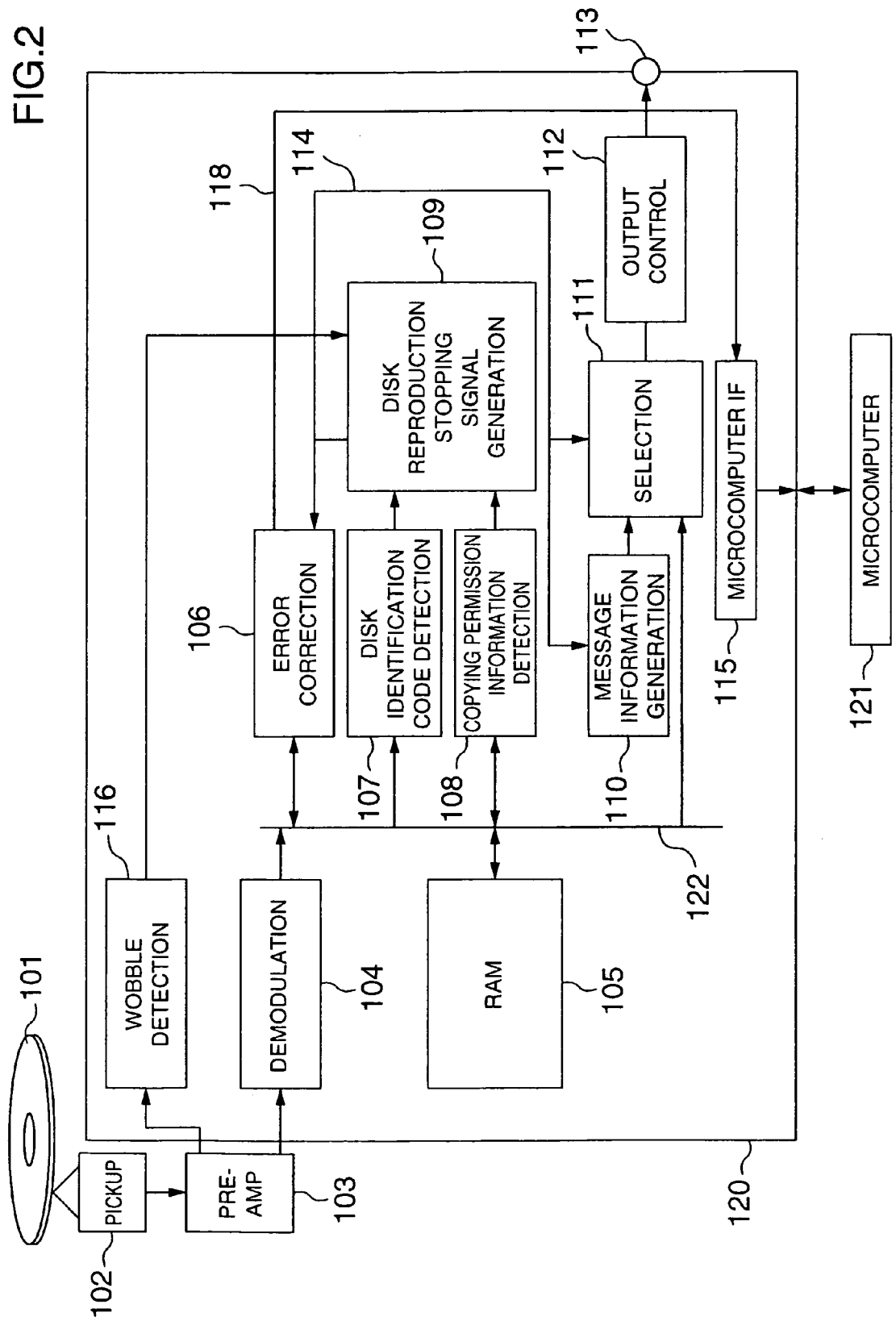
FIG. 2 is a block circuit diagram of a DVD reproduction apparatus showing a second embodiment of the present invention.

FIG. 2 is a block diagram of a DVD reproduction apparatus showing the second embodiment.

The disk 101 reproduced in the present embodiment is intended for a DVD-ROM, a DVD-R, or a DVD-RAM. Among them, groove-shaped tracks are wobbled in the DVD-RAM/R. Therefore, a push-pull signal for tracking is modulated by the wobble. This wobble is required to effect tracking at the time of recording, and it does not exist in the disk dedicated to reproduction.

The present embodiment is the same as the first embodiment except the following three points:

1) A wobble detection circuit 116 is provided;

2) A push-pull signal terminal is provided in the preamplifier 103, and it is connected to the wobble detection circuit 116; and 3) When the wobble detection circuit 116 has judged that there is no wobbling, or when the disk identification code detection circuit 107 has judged the disk to be a disk dedicated to reproduction and simultaneously therewith the copying permission information detection circuit 108 has judged that copying of only one generation was permitted, the disk reproduction stopping signal generation circuit 109 makes the disk reproduction stopping signal 114 active.

In the present embodiment, at the same time that data is reproduced in the same way as the first embodiment, wobble detection is conducted by the wobble detection circuit 116. When either the wobble detection circuit 116 or the disk identification code detection circuit 107 has judged the disk to be a disk dedicated to reproduction and simultaneously therewith the copying permission information detection circuit 108 has judged that copying of only one generation was permitted, the disk reproduction stopping signal generation circuit 109 makes the disk reproduction stopping signal 114 active. Even if the disk identification code is rewritten, therefore, reproduction is inhibited certainly.

As heretofore described, in the present embodiment, it is possible to inhibit reproduction of a pirated edition disk which is produced by temporarily recording a video signal or an audio signal from broadcasting which may be permitted to be copied by only one generation onto a DVD-R or DVD-RAM, and then copying the video signal or the audio signal onto a DVD-ROM on the basis of the DVD-R or DVD-RAM. In the present embodiment, detection of a pirated edition is conducted certainly by judging the disk to be a disk dedicated to reproduction provided that there is no wobble or provided that the identification code indicates a disk dedicated to reproduction. Even if the condition that the identification code indicates a disk dedicated to reproduction is removed from the decision conditions, however, the same effects as the those of the first embodiment are obtained.

A third embodiment of the present invention will now be described by referring to drawing.

FIG. 3 is a block diagram of a DVD reproduction apparatus showing the third embodiment.

The present embodiment is the same as the first embodiment except the following three points:

1) A reflectance identification circuit 117 for processing reflectance information of a disk derived by the preamplifier 103 is provided;

2) A terminal for outputting information of the reflectance is provided in the preamplifier 103, and the terminal is connected to the reflectance identification circuit 117; and 3) When the reflectance identification circuit 117, the wobble detection circuit 116, or the disk identification code detection circuit 107 has judged the disk to be a disk dedicated to reproduction and simultaneously therewith the copying permission information detection circuit 108 has judged that copying of only one generation was permitted, the disk reproduction stopping signal generation circuit 109 makes the disk reproduction stopping signal 114 active.

At the same time that data is reproduced in the same way as the second embodiment, reflectance information is sent from the preamplifier 103 to the reflectance identifying circuit 117 in the present embodiment. The reflectance identifying circuit 117 has a threshold value for the reflectance and identifies a disk yielding a reflectance value which is equal to or larger than the threshold value, as a disk dedicated to reproduction.

When the reflectance identifying circuit 117, the wobble detection circuit 116, or the disk identification code detection circuit 107 has judged the disk to be a disk dedicated to reproduction and simultaneously therewith the copying permission information detection circuit 108 has judged that copying of only one generation was permitted, the disk reproduction stopping signal generation circuit 109 makes the disk reproduction stopping signal 114 active.

Even if the disk identification code is rewritten, reproduction is inhibited certainly. In the present embodiment, detection of a pirated edition is conducted certainly by judging the disk to be a disk dedicated to reproduction provided that the reflectance is equal to or larger than the threshold value, provided that there is no wobble, or provided that the identification code indicates a disk dedicated to reproduction. Even if the disk is judged to be a disk dedicated to reproduction provided that some combination of the three conditions is satisfied, however, the same effects as those of the first embodiment are obtained.

A fourth embodiment of the present invention will now be described by referring to drawing.

FIG. 4 is a block diagram of a DVD reproduction apparatus showing the fourth embodiment.

Instead of inputting the output of the message information generation circuit 110 to the selection circuit 111 and inputting the output of the selection circuit ill to the output control circuit 112, the output of the message information generation circuit 110 is written into the RAM 105 via a RAM write controller 119. Components other than them are common to the third embodiment. In the case where the disk reproduction stopping signal 114 has become active, overwriting is conducted on video data or audio data which should be originally outputted in the present embodiment. As a result, there are obtained the same effects as those of the case where the output of the message information generation circuit 110 is inputted to the selection circuit 111 and the output of the selection circuit 111 is inputted to the output control circuit 112 as in the second embodiment.

Furthermore, in the first to fourth embodiments, the message information for the user is generated in the reproduction apparatus. However, the same effects are also obtained by providing a terminal for outputting the disk reproduction stopping signal 114, sending the disk reproduction stopping signal 114 to a video data display apparatus, an audio output apparatus, a compressed video data or audio data decompression apparatus, or the like, and causing the apparatus receiving the disk reproduction stopping signal 114 to generate the message information.

As heretofore described, reproduction is inhibited according to the present invention in the case where the copying permission information superimposed on the video signal or embedded therein indicates that copying of only one generation was permitted and the disk is judged to be a DVD-ROM. As a result, it is possible to inhibit reproduction from a disk which is produced by temporarily recording video or audio data permitted as to copy of one generation onto a DVD-R/RAM and thereafter illegally copying the recorded data to a DVD-ROM. In addition, in the case where reproduction is inhibited, the cause of the reproduction stoppage can be reported to the user correctly.

Throughout these embodiments, function operation of the circuit for detecting the copying permission information and the disk type, the reproduction stopping signal generation circuit, and the like can be effected by execution of them in a processor in a program form. Therefore, at least a part of the circuit configuration can be implemented in a software fashion by execution, in the processor, of a program stored in memories.

The invention claimed is:

1. A reproduction apparatus for reproducing video data and/or audio data from a medium dedicated to reproduction or a recordable medium having video data and/or audio data recorded thereon, the video data and/or audio data being generated by superimposing information concerning an attribute of a video signal and/or an audio signal on a signal of digitized video data and/or a signal of digitized audio data, the reproduction apparatus comprising:

a reproducing circuit which reproduces the information concerning an attribute superimposed on the video data and/or audio data from the medium;

an identifying circuit which identifies a type of the medium as a medium dedicated to reproduction; and a stopping circuit which stops reproduction in response to a determination that the medium is illegally produced, the determination being based on a combination of the information concerning an attribute reproduced by the reproducing circuit and the type of the medium identified by the identifying circuit as the medium dedicated to reproduction.

2. A reproduction apparatus according to claim 1, wherein the information concerning an attribute of a video signal and/or an audio signal is superimposed on the digitized video signal and/or audio signal by digital watermarking.

3. A reproduction apparatus according to claim 2, wherein the type of the medium is used to identify whether the medium is a copied medium dedicated to reproduction or not.

4. A reproduction apparatus according to claim 2, wherein the superimposed information concerning an attribute of a video signal and/or an audio signal causes the quality of the reproduced video signal and/or audio signal to deteriorate if the superimposed information is altered.

5. A reproduction apparatus according to claim 2, wherein the information concerning an attribute of a video signal and/or an audio signal is information concerning consent of copying.

6. A reproduction apparatus according to claim 1, wherein the illegally produced medium is a duplicated medium dedicated to reproduction.

7. A reproduction method for reproducing video data and/or audio data from a medium dedicated to reproduction or a recordable medium having video data and/or audio data recorded thereon, the video data and/or audio data being generated by superimposing information concerning an attribute of a video signal and/or an audio signal on a signal of digitized video data and/or a signal of digitized audio data, comprising the steps of:

reproducing the information concerning an attribute superimposed on the video data and/or audio data from the medium;

identifying a type of the medium as a medium dedicated to reproduction; and stopping reproduction in response to a determination that the medium is illegally produced, the determination being based on a combination of the information concerning an attribute reproduced by the reproducing step and the type of the medium identified by the identifying step as a medium dedicated to reproduction.

8. A reproduction method according to claim 7, wherein the information concerning an attribute of a video signal and/or an audio signal is superimposed on the digitized video signal and/or audio signal by digital watermarking.

* * * * *